United States Patent [19]

Lindee

[11] Patent Number: 4,872,241
[45] Date of Patent: Oct. 10, 1989

[54] PATTY MOLDING MECHANISM FOR FIBROUS FOOD PRODUCT

[75] Inventor: Scott A. Lindee, New Lenox, Ill.
[73] Assignee: Formax, Inc., Mokena, Ill.
[21] Appl. No.: 264,870
[22] Filed: Oct. 31, 1988
[51] Int. Cl.[4] .............................................. A22C 7/00
[52] U.S. Cl. ........................................ 17/32; 17/45; 426/513
[58] Field of Search ................... 17/32, 45; 99/351; 426/513, 516; 425/227, 228, 239, 240, 573

[56] References Cited

U.S. PATENT DOCUMENTS

| Re. 30,096 | 6/1975 | Richards | 17/32 |
|---|---|---|---|
| 3,731,345 | 5/1973 | Brackman | 17/32 |
| 3,869,757 | 3/1975 | Holly | 17/32 |
| 3,964,127 | 6/1976 | Holly | 17/32 |
| 4,054,967 | 10/1976 | Sandberg et al. | 17/32 |
| 4,097,961 | 7/1978 | Richards | 17/32 |
| 4,126,704 | 11/1978 | McCarthy et al. | 426/304 |
| 4,182,003 | 2/1978 | LaMartino et al. | 17/32 |
| 4,233,710 | 9/1978 | Wagner | 17/32 |
| 4,276,318 | 6/1981 | Orlowski et al. | 17/32 |
| 4,329,828 | 5/1982 | Wagner | 17/32 |
| 4,334,339 | 5/1982 | Holly | 17/32 |
| 4,343,068 | 1/1982 | Holly | 17/45 |
| 4,356,595 | 11/1982 | Sandberg et al. | 17/45 |
| 4,418,446 | 12/1983 | Sandberg et al. | 17/32 |
| 4,535,505 | 5/1984 | Holly et al. | 17/45 |
| 4,541,143 | 11/1983 | Holly | 17/45 |
| 4,597,135 | 2/1984 | Holly et al. | 17/45 |
| 4,608,731 | 9/1986 | Holly | 17/32 |
| 4,622,717 | 11/1986 | Bollinger | 17/32 |
| 4,697,308 | 10/1986 | Sandberg | 17/32 |

Primary Examiner—Willis Little
Attorney, Agent, or Firm—Kinzer, Plyer, Dorn, McEachran & Jambor

[57] ABSTRACT

A mechanism for molding food patties from a fibrous food product (e.g. poultry breasts, fish fillets, large pieces of pork muscle, etc.) uses a conventional mold plate positioned between a fill plate and a breather plate and cyclically movable between a fill position and a discharge position; the fill plate has fill ports, one for each mold cavity in the mold plate, through which the food product is pumped under pressure, each mold cavity having a substantially larger area than its associated fill port. Each fill port has a transitional rim, past which the food flows with an appreciable change in direction, that is smoothly rounded to avoid damage to the food fibers. Each fill port also has a cutting rim, past which a part of the filled mold cavity moves on its way to a discharge position; the cutting rim shears off any food fibers along part of one face of the patty. Preferably, the breather holes in the breather plate are confined to the periphery of each mold cavity position.

15 Claims, 4 Drawing Sheets

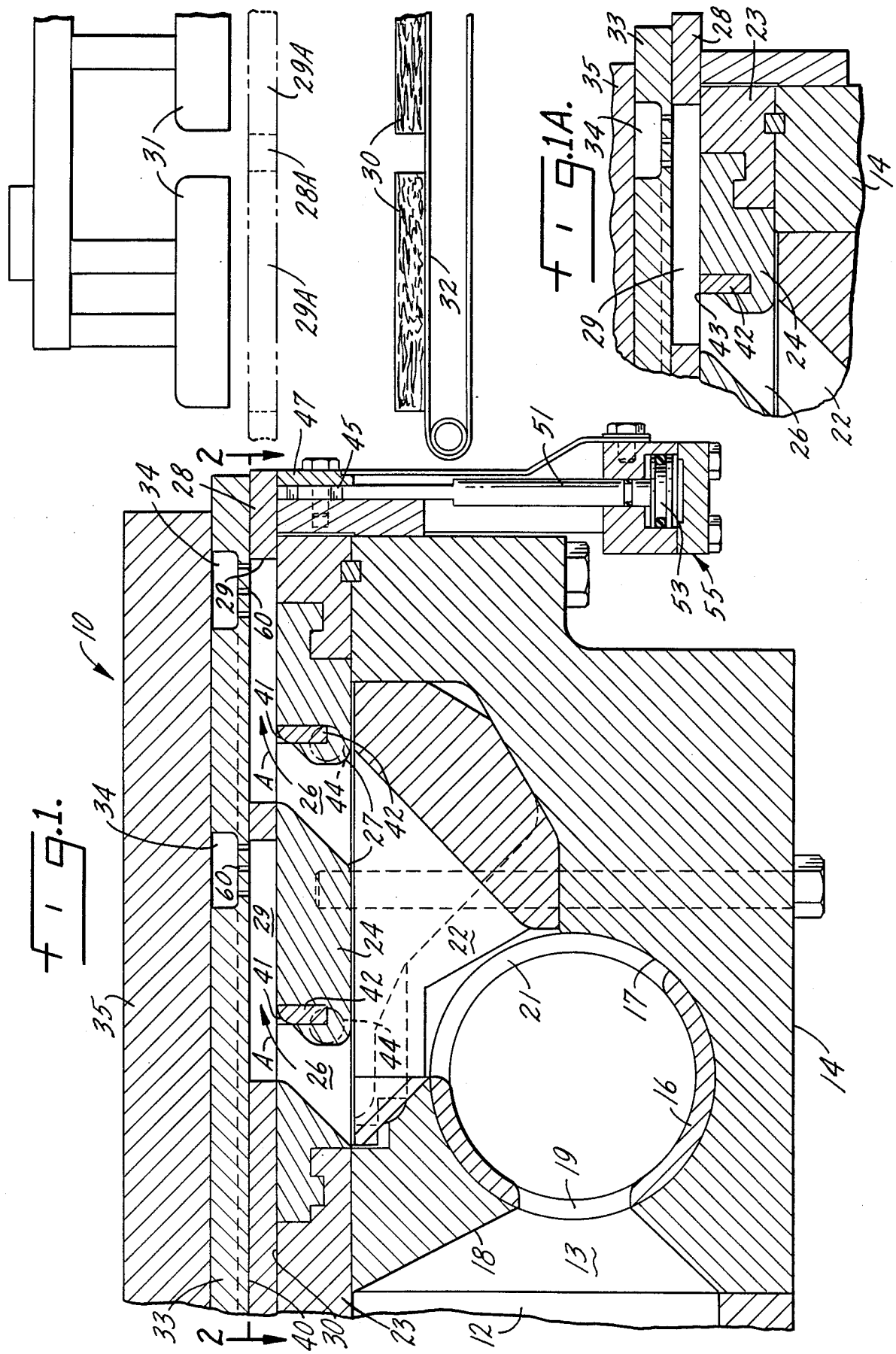

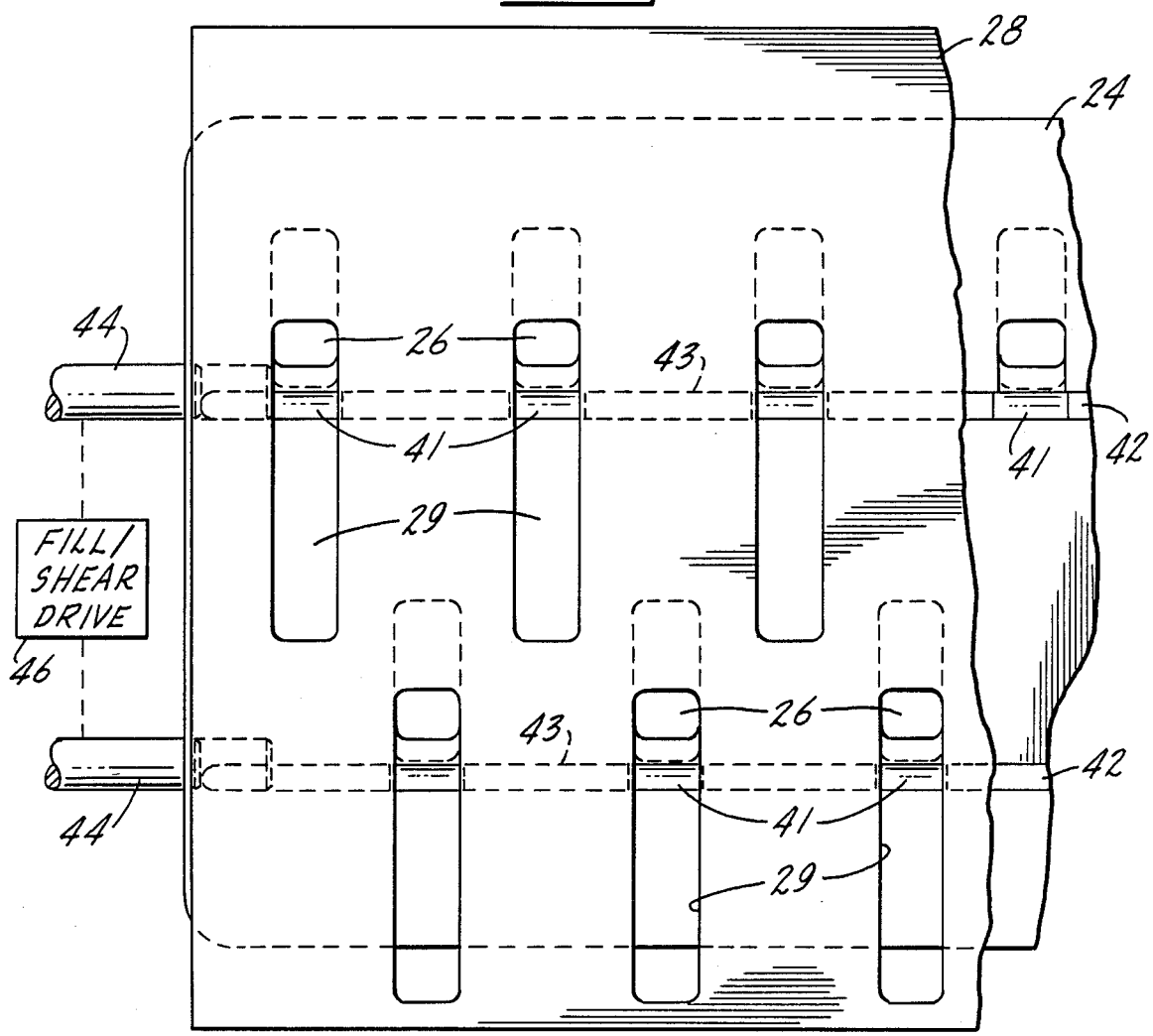

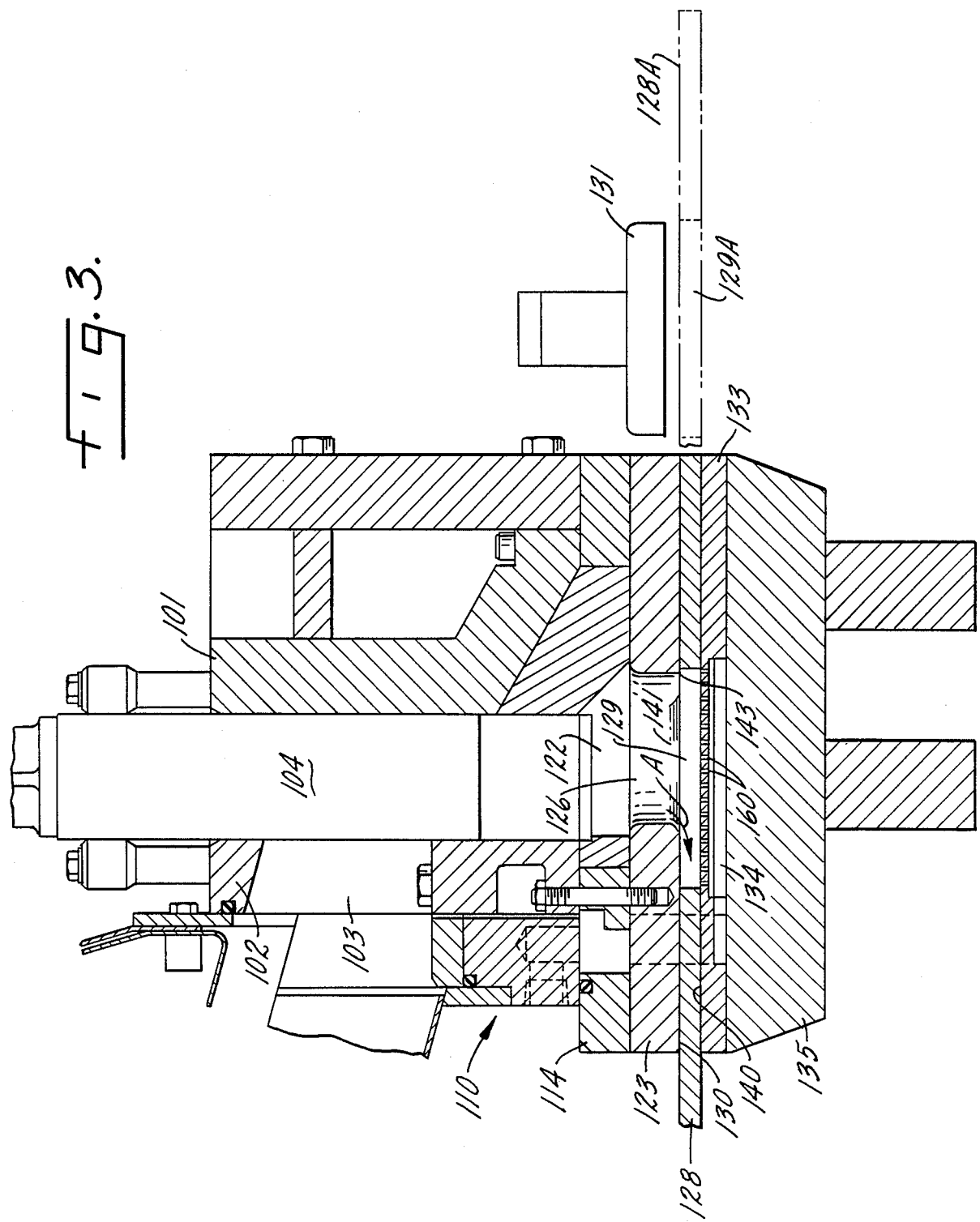

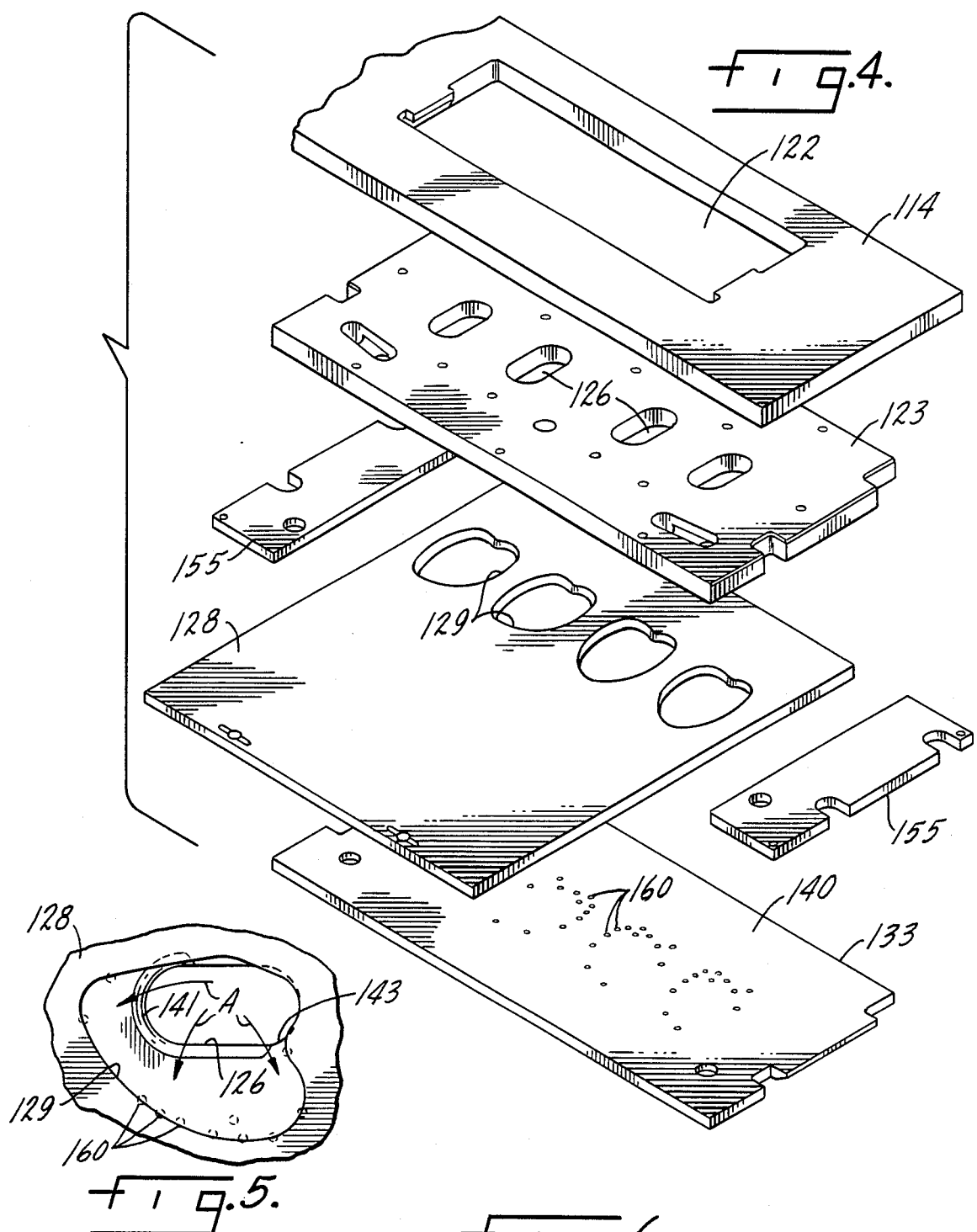

PATTY MOLDING MECHANISM FOR FIBROUS FOOD PRODUCT

BACKGROUND OF THE INVENTION

Food patties of various kinds, including hamburgers, molded "steaks", fish cakes, poultry patties, pork patties, and various vegetable patties, are frequently formed in high volume automated molding machines. Patty molding machines successfully adaptable to any of these food products are described in Richards Reissue U.S. Patent Re. No. 30,096 reissued Sept. 18, 1979, Sandberg et al. U.S. Pat. No. 4,054,967 issued Oct. 25, 1977, and Lamartino et al. U.S. Pat. No. 4,182,003 issued Jan. 8, 1980.

Although any of those machines, and others as well, are capable of producing food patties of consistent size, weight, and configuration on a high volume basis, substantial problems may be encountered when the machines are required to mold patties from food products which, unlike hamburger, have not been ground to relatively small particle size. Thus, it may be desirable to form patties from a food product that has not been chopped or ground; the starting material may consist of whole poultry breasts, large segments of pork or other meat, large fish fillets, or relatively large pieces of almost any food product that has an appreciable fiber content. In this specification and in the appended claims, food products of this general kind are referred to as "fibrous food products".

A molding mechanism that solves many of the problems encountered in molding food patties from a whole fiber food product is described in Sandberg et al. U.S. Pat. No. 4,356,595 issued Nov. 2, 1982. In one form of that molding mechanism, which uses a plural cavity mold plate disposed in close-fitting relationship between planar surfaces of a fill member and a cover member, the food product is pumped into the mold cavities through aligned fill apertures in the fill member; the fill apertures are preferably matched in size to the mold cavities they serve. However, even that molding mechanism presents some technical problems in its operation when employed to mold patties from fibrous food products.

In a molding mechanism of this kind, the total clearance between the mold plate and the adjacent cover member and fill member is only about 0.001 inch to 0.003 inch (0.025 cm. to 0.076 cm.). When pumped into the mold cavities the food product is under high pressure; the pumping pressures may be 400 psi (28 Kg/sq.cm.) in the machine of the Richards patent, 220 psi (15.5 Kg/sq.cm.) in the mechanism of the Lamartino patent, and 250 psi (17.6 Kg/sq.cm.) in the Sandberg et al. U.S. Pat. No. 4,054,967. These high pressures tend to force the mold plate into firm contact with the cover member (usually a breather plate), leaving all of the available clearance as a minute space between the mold plate and the fill member. When the mold plates moves from its fill position toward its discharge position, fibers of the food product tend to be pulled into this very limited space between the mold plate and the fill member, trailing behind the mold cavity, creating an undesirable hinge effect at a later point in the mold plate cycle. Another problem in molding food patties from fibrous products occurs because large segments of the food product may tend to bridge parts of the fill member between fill apertures, so that the bridging food product segments are torn as the high pressure pumping action forces them through the fill apertures. These difficulties are effectively resolved in Sandberg U.S. Pat. No. 4,697,308, issued Oct. 6, 1987.

The Sandberg mechanism, U.S. Pat. No. 4,697,308, does an excellent job in molding patties from fibrous food products when the fill apertures are not substantially smaller than the mold cavities. For some food patties, however, it is better to employ food ports, immediately ahead of the mold cavities, that are substantially smaller in area than the mold cavities. For this situation, any of the known machines, including those referred to above, tend to cut the fibers in the food product along the rims of the food apertures, just ahead of the mold cavities. This can have a noticeable deleterious effect on the finished patties, particularly in appearance, an important consideration in any restaurant operation.

SUMMARY OF THE INVENTION

It is a principal object of the present invention, therefore, to provide a new and improved food patty molding mechanism, particularly adapted for molding food patties of fibrous food products, that effectively minimizes the problems and difficulties described above.

Another object of the invention is to provide a new and improved food patty molding mechanism, adapted to use with fibrous food products, that precludes cutting fibers in the food product as it is pumped into the mold cavities, yet effectively shears off any food product along the surface of the mold cavity facing the fill member.

A further object of the invention is to provide a new and improved molding mechanism for use with fibrous food products that minimizes production of "breather fines".

Accordingly, the invention relates to a molding mechanism for molding food patties from a fibrous food product, which molding mechanism comprises fill directing means including a fill member having a first planar surface with at least one fill port extending through the fill member and the first planar surface, cover means including a cover member having a second planar surface in parallel spaced relation to the first planar surface, and a mold plate having opposed planar surfaces, positioned in close fitting relation between the first and second planar surfaces, the mold plate having at least one mold cavity of predetermined configuration and area therethrough; the area of the mold cavity is substantially larger than the area of the fill port at the first planar surface. Mold plate drive means are provided for driving the mold plate, cyclically, from a fill position in which the mold cavity is aligned with the fill port to a discharge position in which the mold cavity is displaced beyond the fill member, and for subsequently driving the mold plate to its fill position. There are food pump means for pumping a fibrous food product, under pressure, through the fill port to fill the mold cavity and form a food patty in the mold cavity, and knockout means for pushing a molded food patty from the mold cavity at the discharge position of the mold plate. The fill directing means includes a transitional rim for the fill port, adjacent the first planar surface, past which the food product flows into the mold cavity with an appreciable change of direction, the transitional rim having a rounded curvature that precludes appreciable damage to fibers in the food product; the fill directing means further includes a cutting rim for the fill port, at the first planar surface, past which at least a part of the mold cavity moves when the mold plate is driven toward its discharge position, the cutting rim having a sharp edge for shearing food product from the food patty along a plane coincident with the first planar surface.

BRIEF DESCRIPTION OF THE DRAWINGS

FIG. 1 is a sectional side elevation view of a food patty molding mechanism in accordance with one embodiment of the invention.

FIG. 1A is a detail view showing a second operating condition for a of the mold mechanism of FIG. 1;

FIG. 2 is a plan view of a portion of the molding mechanism, taken approximately as indicated by line 2—2 in FIG. 1;

FIG. 3 is a sectional side elevation view of a food patty molding mechanical according to another embodiment of the invention;

FIG. 4 is an exploded perspective view of a portion of the mechanism FIG. 3;

FIG. 5 is a detail view, on an enlarged scale, of a fill port and mold cavity for the mechanism of FIGS. 3 and 4; and FIG. 6 is a sectional side elevation view of a part of a food patty molding mechanism according to a further embodiment of the invention.

DESCRIPTION OF THE PREFERRED EMBODIMENTS

FIGS. 1 and 2 illustrate a food patty molding mechanism 10 for molding food patties from a fibrous food product. Molding mechanism 10 is of the kind described and illustrated in greater detail in the aforementioned Richards U.S. Pat. No. Re. 30,096 and includes some of the improved features disclosed in the aforementioned Sandberg et al. U.S. Pat. No. 4,697,308. The disclosures of those two prior United States patents are incorporated in this specification by reference, and familiarity with them is assumed.

Molding mechanism 10, FIG. 1, usually includes two food pumps, but only the outlet chamber 12 of one pump is shown; the two pumps operate in alternation to afford a continuous pumping action. From chamber 12 a fibrous food product is pumped through a slot 13 into a pump manifold 14. Pump manifold 14 includes a valve cylinder 16 fitted into an opening 17 immediately beyond the pump chamber wall 18 that defines slot 13. Valve cylinder 16 includes two intake slots; only one of these intake slots 19 is illustrated. Intake slot 19 is alignable with the outlet slot 13 for pump chamber 12. Rotation of valve cylinder 16 is effective to move its intake slot 19 out of alignment with pump outlet slot 13 when the food pump feeding chamber 12 is not in operation. Valve cylinder 16 also includes an elongated outlet slot 21 aligned with a fill passage 22 in manifold 14.

The upper part of manifold 14 is covered by a fill plate 23 that includes a fill plate insert 24. Fill plate 23 and insert 24 are referred to conjointly herein as the "fill member" of mechanism 10. The fill plate insert 24 is keyed into fill plate 23 for accurate location; insert 24 extends across the full operating width of molding mechanism 10 and includes a plurality of fill ports 26; see FIGS. 1 and 2. In the illustrated molding mechanism 10, which is set up for molding relatively long, narrow food patties, there are a total of twenty fill ports 26, but only a few of the fill ports are shown in FIG. 2. The entrance rim of each fill port 26, facing passage 22, is rounded as indicated at 27 in FIG. 1.

A mold plate 28 is slidably supported upon a planar upper surface 30 of the fill member comprising fill plate 23 and fill plate insert 24, as shown in FIG. 1. Mold plate 28 is cyclically slidably movable from the fill position shown at the left side of FIG. 1 to a discharge or knockout position shown in part at 28A. The mold plate drive means is not shown in the drawings; appropriate mold plate drives are well known in the art. Mold plate 28 includes a plurality of mold cavities 29 that are aligned one-for-one with fill apertures 26. The discharge positions for two of the mold cavities are shown at 29A in FIG. 1. As is apparent from FIGS. 1 and 2, the area of each mold cavity is substantially larger than the area of its associated fill port at the planar top surface 30 of fill member 23,24.

A series of knockout cups 31 are included in molding mechanism 10, one knockout cupt 31 for each mold cavity 29. Whenever mold plate 28 is in its discharge position 28A, each of its mold cavities is in a position 29A aligned with one of the knockout cups 31. Knockout cups 31 conform closely in size and configuration to the mold cavities with which they are associated. A takeaway conveyor 32 is positioned below mold plate 28 to receive molded food patties dislodged from the mold cavities by knockout cups 31.

A breather plate 33 is positioned immediately above mold plate 28 in molding mechanism 10. Plate 33 is provided with a plurality of air pressure release passages 34. A plurality of tiny breather holes 60 connect each passage 34 with the lower surface 40 of breather plate 33. A cover plate 35 positioned above breather plate 33 closes off the top surfaces of breather passages 34. Plates 33 and 35 are referred to conjointly herein as the "cover member" of molding mechanism 10.

As thus far described, molding mechanism 10 is well known in the art from the aforementioned United States patents to Richards and Sandberg and from the FORMAX 26 patty molding machines manufactured and sold by Formax, Inc. of Mokena, Illinois, U.S.A. In the operation of molding mechanism 10, a supply of a moldable food product is pumped under pressure from chamber 12 through valve slots 19 and 21 and into fill passage 22. The food product, under relatively high pressure, also fills each of the fill ports 26 in fill plate insert 24.

With mold plate 28 in the fill position shown at the left side of FIG. 1, the food product is forced under pressure through passage 22 and ports 26, filling each of the mold cavities 29. After the mold cavities have been filled, mold plate 28 is advanced to its discharge position, with the mold cavities in locations 28A. Knockout cups 31 are then driven downwardly, discharging the molded food patties 30 from the mold cavities, at positions 29A, onto takeaway conveyor 32. The knockout cups are then retracted and mold plate 28 is moved back to its fill position to receive a new charge of food product in each of its mold cavities 29. This cycle of operation is continued indefinitely; the cycle rate for mold plate 28 may be as high as eighty or ninety cycles per minute. As long as molding mechanism 10 is in operation, the food product is maintained under constant or intermittent high pressure in pump chamber 12 (or in the second pump), valve cylinder 16, fill passage 22, and fill apertures 26.

In molding mechanism 10, the total of the clearances at the surfaces 30 and 40 below and above mold plate 28 is quite small, usually about 0.001 to 0.003 inch (0.025 cm. to 0.076 cm.) When mold plate 28 moves its discharge position the presssure of the food product forces the mold plate up against cover member 33 so that essentially all of this clearance appears along planar surface 30. With fibrous food products, substantial difficulties may be encountered, due to food product fibers trailing from mold cavities 29 between mold plate 28 and fill member 23,24; these include poor registration of patties on conveyor 32 and appearance defects.

In molding mechanism 10, this difficulty is effectively eliminated by use of a series of shear blades 45, FIG. 1, one shear blade 45 for each mold cavity 29. A guide bar 47 holds blades 45 in place. Each shear blade 45 has a width exceeding the maximum width of its associated mold cavity 29. Shear blades 45 are aligned one-for-one with pusher rods 51. A series of pistons 53 in a manifold 55 are aligned one-for-one with pusher rods 51.

With mold plate 28 in its fill position receiving food product shear blades 45 are at or very slightly displaced below the level of the planar surface 30 so that the shear blades do not interfere with movement of mold plate 28 to its discharge position. Shortly after mold plate 28 begins its outward movement toward its discharge position, pistons 53 are actuated. Upward movement of each piston 53 drives its pusher rod 51 upwardly and forces one shear blade 45 up into firm engagement with the bottom surface of mold plate 28 as the mold plate is emerging from molding mechanism 10. The pressure of engagement between each shear blade 45 and the bottom of mold plate 28 may be substantial. Actuation of pistons 53 ends shortly before the mold plate reaches its discharge positions 28A. As a consequence, shear bars 45 drop back down from surface 30 through a very limited distance, which should preferably be less than 0.05 inch (0.127 cm.).

As mold cavities 29 in mold plate 28 emerge from molding mechanism 10 in the movement of mold plate 28 toward its discharge position, sharp leading edges on shear blades 45 cut trailing fibers from the patties. Consequently, when mold plate 28 reaches its discharge position there is little or no tendency toward a hinging action on the discharge of the molded food patties, effectively eliminating registration problems and other difficulties discussed above. Shear bars 45 make it practical to utilize molding mechanism 10 with fibrous food products at substantially higher temperatures, and consequently lower filling pressures, than would be permissible in the same mechanism not equipped with the shear bar apparatus, with a resultant substantial saving for the machine operator. However, it should be understood that the shear mechanism comprising blade 45 has been shown only to disclose the best mode for the invention and may be omitted.

In molding mechanism 10, as previously noted, each mold cavity 29 has an area substantially larger than the area of its associated food port 26 at surface 30; this relationship is clearly apparent in both FIGS. 1 and 2. As a consequence, food product entering cavities 29 from ports 26 undergoes an appreciable change of direction as it traverses the front transitional rim 41 of each food port, as shown by arrows A in FIG. 1. If rim 41 were a sharp cutting edge substantial damage to the food product fibers could occur, with consequent deterioration in the appearance, texture, and general quality of the food patties. To avoid this cutting damage, transitional rims 41 on food ports 26 should be smooth and rounded to facilitate passage of the food product with the required substantial and rather abrupt change of direction (arrows A) while avoiding damage to fibers in the food product.

When mold plate 28 is driven out to its discharge position 28A, however, the effect at the leading edge rim of each food port changes. For this part of the mold plate cycle, rounded transitional rims 41 are not advantageous; they are at best neutral and actually may produce undesirable results. Some fibers in the food product, under pressure in ports 26 as well as in mold cavities 29, extend from each port 26 into the associated cavity 29; these fibers should be cut off cleanly to avoid a rough bottom section on the patty and to assure consistent, well defined surfaces for each patty. To this end, during outward movement of mold plate 28 each port 26 should afford a sharp cutting front edge to shear off the bottom of the patty in its associated mold cavity.

In molding mechanism 10 this is accomplished by providing two fill/shear bars 42 that, between them, extend across the front edge of each and every fill port 26, transversely to the direction of mold plate movement, so that fill/shear bars 42 constitute the front rims for all of the fill ports 26. With bars 42 in the positions shown in FIGS. 1 and 2, their positions during filling of mold cavities 29, each bar 42 affords a rounded transitional rim 41 across the front of each of its associated fill ports 26. But just before mold plate 28 starts its movement toward discharge position, each fill/shear bar 42 is shifted a short distance longitudinally to bring another segment 43 of the bar into alignment with the front of each fill port 26. This condition is illustrated in FIG. 1A, in which mold plate 28 has just started movement from its fill position to its discharge position. Bar segments 43 afford a sharp cutting rim across the front of each port 26, transverse to the direction of mold plate (and mold cavity) movement. Movements of bars 42 to replace transitional rims 41 with cutting rims 43, and vice versa, may be effected by an appropriate drive 46, synchronized with mold plate cycling, as represented by pusher rods 44 in FIG. 2; a second pair of such pusher rods (not shown) may be provided on the opposite side of molding mechanism 10.

FIG. 3 illustrates a patty molding mechanism 110 comprising a further embodiment of the present invention; individual components and details of construction are shown in FIGS. 4 and 5. Molding mechanism 110 is derived from the food patty molding machine of Sandberg et al. U.S. Pat. No. 4,054,967; familiarity with that machine and with the commercial FORMAX F-19 machine, manufactured and sold in substantial quantities by Formax, Inc. of Mokena, Ill., are assumed. Molding mechanism 110 comprises a pump housing including two housing members 101 and 102. An inlet opening 103 in housing member 102 communicates with a pump chamber in which a pump plunger 104 is positioned. The lower end of the pump chamber comprises a fill passage 122 through a pump base 114.

Fill passage 122, FIGS. 4 and 5, serves four fill ports 126 that extend through a fill plate 123. The upper rims of fill ports 126, facing fill passage 122, are all smooothly rounded to avoid cutting or tearing of fibrous food products processed in molding mechanism 110. The rims of food ports 126 facing downwardly away from fill passage 122, however, are of different construction. Thus, the lower rim of each fill port 126, facing a mold plate 128, includes a rounded, smooth, transitional rim portion 141 around approximately nehalf of the fill port. The remaining rim 143 of each fill port has a sharp cutting edge. See FIGS. 3 and 5.

In molding mechanism 110 the reciprocally movable mold plate 128 includes four irregularly shaped mold cavities 129. The area of each mold cavity 129 is substantially larger than the area of the related fill port 126 at the surface 130 between fill plate 123 and mold plate 128. This relationship is best illustrated in FIGS. 4 and 5, particularly in FIG. 5 in which it is seen that at the fill position of mold plate 128, a corner portion of mold cavity 129 is aligned with the periphery of fill port 126. As also best seen in FIG. 5, a substantial portion of the periphery of mold cavity 129 is closely aligned with the sharp, cutting rim portion 143 of fill port 126.

A pair of spacers 155 (FIG. 4) are interposed between fill plate 123 and a breather plate 133 that is a part of the cover means for mold mechanism 110. The cover means further comprises a mold mechanism base 135 that serves the same function, as regards operation of the molding mechanism, as cover member 35 in FIG. 1. Breather plate 133 is provided with appropriate air relief passages 134 that are closed off on the bottom side by cover 135. A plurality of very small breather holes 160 are provided in plate 133; holes 160 extend from surface 140 of plate 133 into the relief passages 134. Unlike the generalized breather hole patterns used in other molding machines, the arrangement of breather openings 160 is coordinated with the shape of each mold cavity 129. Thus, as best shown in FIG. 5 but also indicated generally in FIG. 4, the tiny breather holes 160 are all distributed around the periphery of mold cavity 129, when the mold plate 128 is in its fill position. There are no small breather holes 160 aligned with the central portion of any mold cavity 129 during filling of the mold cavities.

Operation of molding mechanism 110, FIGS. 3-5, is essentially similar to and affords the same basic advantages as mechanism 10 of FIGS. 1 and 2. Thus, with mold plate 128 in the fill position as shown in FIG. 3, the mold cavities 129 are aligned one-for-one with fill ports 126. Approximately one-half of each fill port rim is a transitional rim 141 of smooth-rounded configuration, past which fibrous food product must move with a substantial change of direction as indicated by arrows A in FIGS. 3 and 5. The remainder of the rim of each food port 126 is a sharp cutting edge 143 that could damage the fibers in the food product, but has little or no opportunity to do so because the sharp cutting edges are each aligned approximately evenly with the walls of one of the food cavities 129. With this arrangement, the food product passes easily by the fill port rim without damage because it does not change direction.

At a different point in the mold plate cycle, the mold plate is driven from the position 128 of FIG. 3 outwardly of mold mechanism 110 toward the position 128A, in which each mold cavity is at a position 129A aligned with a knockout cup 131. During this movement of the mold plate, the sharp cutting edge rim 143 of each fill port shears the food product from the food patty along a plane coincident with the plane 130 along the bottom surface of fill plate 123. In this way, the sharp cutting rim 143 of each fill port assures a smooth, consistent finish on the top surface of each molded patty.

The use of a limited number of breather holes 160 and their distribution around that portion of the mold cavity that is not coincident with fill port 126 is of appreciable importance in improving the operation of mold mechanism 110. Thus, the illustrated breather hole arrangement materially reduces the quantity of the food product that is forced into the breather holes. Any food product that is pressed into the breather holes is usually sheared off and left in those holes when the mold plate is driven from its fill position to its discharge position. The resulting particles, sometimes called "breather fines" are quite undesirable and can interfere with effective operation of the molding mechanism. Thus, the reduction of "breather fines" due to the limited number and special positioning of breather holes 160 adds materially to the benefit derived from the invention. Of course, the same technique can be applied to the breather holes 60 in the embodiment of FIGS. 1 and 2.

The choice between molding mechanism 10 and molding mechanism 110, in implementation of the invention, is often determined primarily by the shape of the patties. For a regular or other balanced configuration, such as the elongated patties molded in cavities 29, the embodiment of FIGS. 1 and 2 using fill/shear members 42 is likely to be the best; it allows for a smooth, rounded transitional rim 41 across the entire front of the fill port while the molded cavity is being filled, yet affords an effective cutting edge 43 to shear off the exposed bottom portion of the patty when the mold plate is driven to its discharge position. The embodiment of FIGS. 3-5, with the transitional rim 141 and cutting rim 143 permanent features of each fill port 136, is slightly less efficient but works well for irregular patty shapes such as those exemplified by mold cavities 129. Even with quite irregular mold cavity configurations, the fill ports can be arranged to provide smooth, rounded transitional rims 141 where necessary to allow free passage of food product with marked changes of direction, while at the same time presenting sharp cutting rims 143 to shear off the bottom of each mold cavity when the mold plate is driven to its discharge position.

FIG. 6 is a detail view illustrating an adaptation of the embodiment of FIGS. 3-5 to production of patties of a regular configuration such as those produced in the mechanism of FIGS. 1 and 2. FIG. 6 shows only a portion of the fill insert 224 with one fill port 226, a mold plate 228 with one mold cavity 229, and a breather plate 233 covering the mold cavity 229. Breather plate 233 is essentially the same as breather plate 33 of FIG. 1, and mold plate 228 is the same as mold plate 28 of mechanism 10. In fill insert 224, port 226 is quite similar to the previously described port 26 except that there is a composite rim configuration on the front edge of the fill port. That is, fill port 226 has a smooth transitional rim 241 over which food product flows, with a substantial change of direction, as indicated by arrow A. But transitional rim 241 does not quite come up to the plane 230 defined by the top surface of fill insert 224. Instead, there is a very shallow recess across the leading edge of the rim of fill port 226, terminating in a sharp cutting or shearing rim 243. The recess depth for rim 241 may be of the order of 0.0625 inch (0.16 cm.).

Operation of the modification shown in FIG. 6 is essentially similar to that of mechanism 110, FIGS. 3-5, except that it is applied to a mold cavity of regular configuration of the kind exemplified by mold cavities 29 in FIGS. 1 and 2. The modification of FIG. 6 is not quite as effective in preventing cutting of fibers in the food product during filling of the mold cavity, but it does produce reasonably good results in this regard and is substantially less costly than the fill/shear bar embodiment, molding mechanism 10.

I claim:

1. In a molding mechanism for molding food patties from a fibrous food product, which molding mechanism comprises:
   fill directing means including a fill member having a first planar surface with at least one fill port extending through the fill member and the first planar surface;
   cover means including a cover member having a second planar surface in parallel spaced relation to the first planar surface;
   a mold plate having opposed planar surfaces, positioned in close fitting relation between the first and second planar surfaces, the mold plate having at least one mold cavity of predetermined configuration and area therethrough, the area of the mold cavity being substantially larger than the area of the fill port at the first planar surface;
   mold plate drive means for driving the mold plate, cyclically, in a given direction from a fill position in which the mold cavity is aligned with the fill port to a discharge position in which the mold cavity is displaced beyond the fill member, and for subsequently driving the mold plate to its fill position;
   food pump means for pumping a fibrous food product, under pressure, through the fill port to fill the mold cavity and form a food patty in the mold cavity; and
   knockout means for pushing a molded food patty from the mold cavity at the discharge position of the mold plate;
   the improvement in which:
   the fill directing means includes a transitional rim for the fill port, adjacent the first planar surface, past which the food product flows into the mold cavity with an appreciable change of direction, the transitional rim having a rounded curvature that precludes appreciable damage to fibers in the food product; and
   the fill directing means further includes a cutting rim for the fill port, at the first planar surface, past which at least a part of the mold cavity moves when the mold plate is driven toward its discharge position, the cutting rim having a sharp edge for shearing food product from the food patty along a plane coincident with the first planar surface.

2. A food patty molding mechanism according to claim 1 in which:
   the transitional rim extends across the front edge of the fill port, transverse to said given direction;
   the cutting rim also extends across the front edge of the fill port, transverse to said given direction; and
   a substantial portion of the mold cavity is positioned in front of the front edge of the fill port when the mold plate is in its fill position.

3. A food patty molding mechanism according to claim 2, in which the transitional rim and the cutting rim for the fill post comprise individual segments of a fill/shear member extending across the front of the fill port, the molding mechanism further comprising:
   fill/shear drive means for aligning the transition rim segment of the fill/shear member with the front of the fill port whenever the mold plate is in its fill position and for aligning the cutting rim segment with the front of the fill port whenever the mold plate is driven from its fill position toward its discharge position.

4. A food patty molding mechanism according to claim 3 in which the transitional rim and the cutting rim for the fill port are adjacent longitudinal segments of an elongated fill/shear member, and in which the fill/shear drive means drives the fill/shear member in a reciprocal, longitudinal motion.

5. A food patty molding mechanism according to claim 2 in which the transitional rim and the cutting rim are both formed as integral parts of the fill member, the cutting rim is coincident with the first planar surface, and the transitional rim extends parallel to the cutting rim but is recessed a very small distance from the first planar surface.

6. A food patty molding mechanism according to claim 1 in which:
   the transitional rim extends around a first part of the periphery of the fill port and the cutting rim extends acround the remaining part of the periphery of the fill port, at the first planar surface; and
   at least a part of the cutting rim of the fill port is aligned with the rim of the mold cavity when the mold plate is in its fill position, minimizing damage to fibers in the food product during filling of the mold cavity.

7. A food patty molding mechanism according to claim 6 in which the transitional rim encompasses at least about forty percent of the fill port rim.

8. A food patty molding mechanism according to claim 6 in which the cutting rim is at the front edge of the fill port.

9. A food patty molding mechanism according to claim 8 in which the transitional rim encompasses at least about forty percent of the fill port rim.

10. A food patty molding mechanism according to claim 1 in which the cover member is a breather plate having a plurality of tiny breather holes therethrough, the breather holes being limited to an area in the breather plate that is aligned with the periphery of the mold cavity when the mold plate is in its fill position.

11. A food patty molding mechanism according to claim 10 in which:
    the transitional rim extends around a first part of the periphery of the fill port and the cutting rim extends acround the remaining part of the periphery of the fill port, at the first planar surface; and
    at least a part of the cutting rim of the fill port is aligned with the rim of the mold cavity when the mold plate is in its fill position, minimizing damage to fibers in the food product during filling of the mold cavity.

12. A food patty molding mechanism according to claim 11 in which the transitional rim encompasses at least about forty percent of the fill port rim.

13. A food patty molding mechanism according to claim 12 in which the cutting rim is at the front edge of the fill port.

14. A food patty molding mechanism according to claim 10 in which:
    the transitional rim extends across the front edge of the fill port, transverse to said given direction;
    the cutting rim also extends across the front edge of the fill port, transverse to said given direction; and
    a substantial portion of the mold cavity is positioned in front of the front edge of the fill port when the mold plate is in its fill position.

15. A food patty molding mechanism according to claim 10 in which the transitional rim and the cutting rim are both formed as integral parts of the fill member, the cutting rim is coincident with the first planar surface, and the transitional rim extends parallel to the cutting rim but is recessed a very small distance from the first planar surface.

* * * * *